Figures 1, 2:
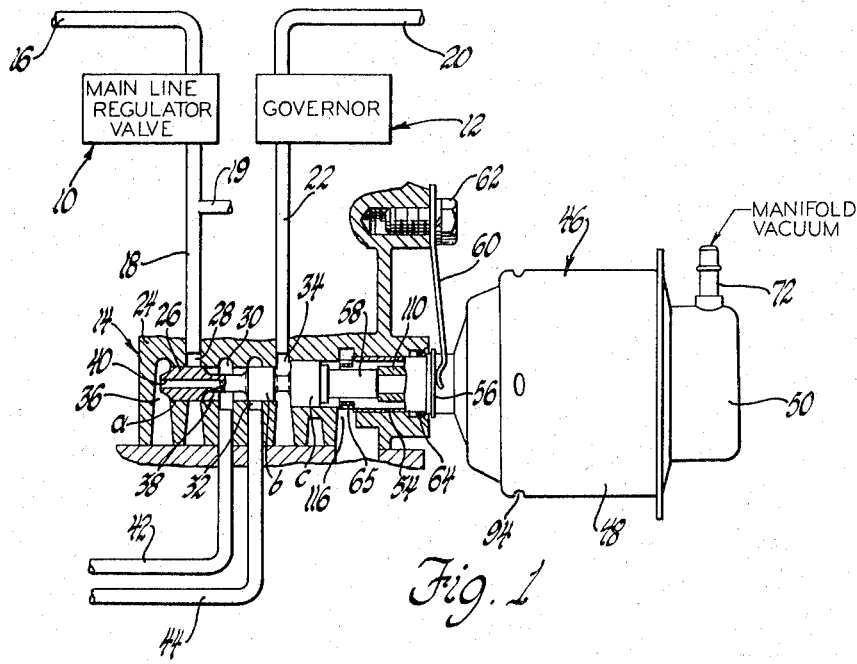

INVENTOR.
Ronald C. Groves

United States Patent Office 3,295,388
Patented Jan. 3, 1967

3,295,388
TRANSMISSION CONTROL
Ronald C. Groves, Rochester, N.Y., assignor to General Motors Corporation, Detroit, Mich., a corporation of Delaware
Filed Sept. 5, 1963, Ser. No. 306,886
20 Claims. (Cl. 74—472)

This invention relates generally to the art of control systems and more particularly to ambient atmospheric pressure compensated vacuum modulators for use in automatic transmission control systems.

Prior to the introduction of such modulators, which are more commonly known as altitude compensated vacuum modulators, it had been the practice to provide in the transmission control system a line pressure modulator or control valve wherein the regulated line pressure is varied in proportion to engine torque as a function of engine intake manifold vacuum. Such line pressure control valves were found to be generally satisfactory so long as changes in ambient atmospheric pressure, resulting from altitude and climate changes, were not encountered. However, where changes in ambient atmospheric pressure were encountered, it was found that such control valves no longer controlled the line pressure in the desired manner since such changes affect intake manifold vacuum. This resulted in an improper relationship between the resultant transmission clutch and/or brake forces and engine torque causing harsh engaging action, especially noticeable during shifting of the transmission from one speed ratio to another. The altitude compensated vacuum modulators of the prior art generally employ a constant reference pressure, such as a vacuum or a positive pressure, sealed and contained in an expansible and contractible chamber which is responsive to changes in ambient atmospheric pressure to correct for the changes in intake manifold vacuum with decreasing or increasing ambient atmospheric pressure and render the line pressure regulator valve effective to maintain a normal range of line pressure for a given torque and vehicle speed range irrespective of the varying ambient atmospheric pressure at which the vehicle may be operated.

Vacuum modulators, as commonly employed, modulate the fluid pressure in the control system to supply a regulated control pressure to bias transmission controls and fluid elements, such as shift valves and main line regulator valves, in opposition to biasing forces such as spring forces and fluid pressures such as governor pressure. The altitude compensated vacuum modulators of the prior art generally employ either sealed bellows or a sealed chamber or chambers defined by one or more diaphragms to contain the constant reference pressure which may be either a vacuum or a positive pressure and to provide a trimming effect on the net effective output force of the vacuum modulator to correct for changes in ambient atmospheric pressure.

In those vacuum modulators employing diaphragms to define one or more chambers for containing a constant reference pressure such as a vacuum, difficulties often arise because the materials of these diaphragms are generally not sufficiently impervious to the diffusion of air therethrough, especially where a sealed vacuum is to be maintained over an extended period of time.

Another difficulty encountered is where seal rings are utilized to seal a movable member, such as a piston rod or the like, in one or more of the pressure chambers since the friction developed in these seal rings tends to prevent the smooth operation of the vacuum modulator.

Another difficulty frequently encountered is where the vacuum modulator has a sealed bellows containing the reference pressure with such bellows being exposed to the intake manifold vacuum and independently movable relative to a diaphragm which is exposed on opposite sides to atmospheric pressure and manifold vacuum. In such arrangements the bellows structure is worked very hard as it expands or retracts independently of the diaphragm with every change of intake manifold vacuum which, of course, occurs when the throttle position and speed change and thus adversely affects the life of the vacuum modulator.

In vacuum modulators having a diaphragm exposed both to intake manifold vacuum and ambient atmospheric pressure and a sealed bellows containing the reference pressure exposed to ambient atmospheric pressure, a spring on the intake manifold or vacuum side of the diaphragm is commonly employed to provide a biasing force resisting movement of the diaphragm in response to changes in intake manifold vacuum with the sealed bellows being arranged to compensate for the changes in ambient atmospheric pressure. In such arrangements, the diaphragm and bellows are connected to the control valve element to be controlled and the spring provides a primary and major force in one direction to resist a hydraulic force in the transmission control system acting in the opposite direction on the control valve element. In these arrangements, the spring force is trimmed by changes in intake manifold vacuum acting on the diaphragm and changes in ambient atmospheric pressure acting on the bellows to provide the net effective output force of the modulator to balance the hydraulic force. It has been found that certain disadvantages arise since the spring contributes the primary and major biasing force of the vacuum modulator to oppose the hydraulic force in the transmission control system, with the sealed bellows and diaphragm serving to either add to or subtract from this spring biasing force in response to changes in ambient atmospheric pressure and intake manifold vacuum. This type of arrangement while it has been found to be generally satisfactory has certain disadvantages. For instance, since the spring provides the primary and major biasing force, the responsiveness of such vacuum modulators to small changes in ambient atmospheric pressure is limited and thus limits the accuracy of the shift points. Another difficulty arises in calibration of such vacuum modulators for a particular engine-transmission vehicle combination since the primary and major biasing force which is provided by the spring is not responsive to the variable parameter, the ambient atmospheric pressure which is to be corrected for.

With the foregoing in mind, this invention as illustrated in one embodiment employs a sealed and evacuated bellows exposed to ambient atmospheric pressure, connected at one end to ground and at the other end to both a diaphragm and an output element which operatively connects to the control valve element to be controlled. One side of the diaphragm is exposed to ambient atmospheric pressure and the opposite side to engine intake manifold vacuum. Ambient atmospheric pressure acting on the sealed bellows provides the primary and major biasing force acting in one direction to oppose the hydraulic force in the transmission control system acting in the opposite direction on the control valve element. The biasing force provided by the evacuated bellows which is directly related to ambient atmospheric pressure is, for instance, decreased by decreasing intake manifold vacuum acting on the diaphragm so that the net effective output force of the vacuum modulator is reflective of engine torque and is closely responsive to small changes in ambient atmospheric pressure to effect a predetermined closely controlled normal range of line pressure irrespective of the varying ambient atmospheric pressure. To aid in calibrating this vacuum modulator, a calibrating compression spring in parallel arrangement with the evacuated bellows may be added to decrease the net effective output force of the vacuum modulator. To more clearly define this vacuum modulator, it shall be referred to hereinafter as an ambient atmospheric pressure vacuum compensated modulator rather than an altitude compensated vacuum modulator.

It is an object of this invention to provide an improved ambient atmospheric pressure compensated vacuum modulator.

It is another object of this invention to provide in a transmission control system for an engine driven vehicle an improved ambient atmospheric pressure compensated vacuum modulator providing a net effective output force to a control valve in the system in opposition to hydraulic force in the system acting on the control valve closely responsive to correct for small changes in ambient atmospheric pressure.

It is another object of this invention to provide in a transmission control system for an engine driven vehicle an ambient atmospheric pressure compensated vacuum modulator having first motor means responsive to ambient atmospheric pressure providing an output force relative to a fixed reference in one direction to a control valve and another motor means responsive to changes in intake manifold vacuum to vary the output force.

Another object of this invention is to provide in a transmission control system for an engine driven vehicle an ambient atmospheric pressure compensated vacuum modulator having a sealed and evacuated bellows exposed to ambient atmospheric pressure providing an output force in one direction to a control valve and motor means responsive to an increasing intake manifold vacuum to decrease the output force to control the control valve and vary fluid pressure in the control system with respect to engine torque as a function of intake manifold vacuum and correct for changes in engine vacuum resulting from changes in ambient atmospheric pressure.

It is another object of this invention to provide in a transmission control system for an engine driven vehicle an ambient atmospheric pressure compensated vacuum modulator having a sealed and evacuated bellows exposed to ambient atmospheric pressure providing a primary and major output force in one direction to a control valve in opposition to a hydraulic force in the control system and motor means including a diaphragm exposed on one side to intake manifold vacuum and on the other side to ambient atmospheric pressure and responsive to an increasing intake manifold vacuum to decrease the output force provided by the bellows to provide a net effective output force to control the fluid pressure in the control system with respect to a fixed reference pressure and engine torque as a function of intake manifold vacuum.

It is another object of this invention to provide in a transmission control system for an engine driven vehicle an ambient atmospheric pressure vacuum modulator having a sealed and evacuated metallic bellows having an inherent spring biasing force exposed to ambient atmospheric pressure providing an output force in one direction to a control valve in the control system biased in the opposite direction by a hydraulic force in the control system, motor means including a diaphragm having one side exposed to intake manifold vacuum of the engine and its opposite side exposed to ambient atmospheric pressure responsive to an increasing intake manifold vacuum to decrease the output force of the bellows and responsive to a decreasing intake manifold vacuum to permit an increase in the output force of the bellows as a function of engine torque and calibrating spring means arranged to decrease the output force of the bellows in addition to the inherent spring biasing force of the bellows so that the vacuum modulator provides a net effective output force in opposition to the hydraulic force acting on the control valve to control fluid pressure in the control system within a closely controlled predetermined range of values and provide increasing fluid control pressure with increasing ambient atmospheric pressure and decreasing manifold vacuum and a decreasing fluid control pressure with decreasing ambient atmospheric pressure and increasing manifold vacuum.

These and other objects will be more apparent from the following description and drawing of the preferred embodiment of the invention.

FIGURE 1 diagrammatically illustrates a portion of a transmission control system of an automatic transmission for an engine driven vehicle having a control valve controlled by an ambient atmospheric pressure compensated vacuum modulator embodying features of this invention.

FIGURE 2 is a sectional view through the ambient atmospheric pressure compensated vacuum modulator of FIGURE 1.

Referring to the drawing, and particularly to FIGURE 1, the portion of the fluid pressure control system, illustrated diagrammatically, is for supplying fluid under pressure to the transmission controls and fluid elements of an automatic transmission for an engine driven vehicle. The fluid pressure control system includes a main line regulator valve 10 for regulating the supply of fluid under pressure, a governor 12 for delivering fluid under a variable pressure which changes in proportion to the speed of the vehicle and a modulator or control valve 14 for controlling the pressure of the fluid supplied to the transmission controls and fluid elements, such as shift valves and the like, which control the shifts in the transmission. As will be described in detail later, the control valve 14 develops a controlled regulated pressure which is reflective of vehicle speed, torque load on the engine and is uninfluenced by changes in ambient atmospheric pressure.

Fluid such as oil is drawn from a sump, not shown, and delivered under pressure by an engine driven pump, not shown, to a pump discharge passage 16 connected to the main line regulator valve 10. Regulator valve 10, which may be of any suitable known type, receives the discharged fluid under pressure from the pump, delivers it to a feed or main passage 18 and regulates the fluid under pressure in passage 18 at a predetermined pressure to provide a regulated fluid pressure source. A branched passage 19 connected to feed passage 18 communicates the regulated pressure in passage 18 via suitable transmission controls and fluid elements, such as a selector valve and shift valves and the like of any suitable known type, with the clutch and/or brake motors to effect the different speed ratios in the transmission.

The governor 12, which may be of any suitable known type, receives a regulated fluid pressure via a governor supply passage 20 from a suitable source, such as from the feed passage 18 via the branch passage 19. Governor 12 is controlled by the speed of the vehicle, not shown, and delivers a variable pressure which increases with increase in vehicle speed to a governor pressure delivery passage 22.

The control valve 14 has a valve housing 24 in which is slidably mounted a modulator or control valve element 26 of the spool type having a series of spaced lands $a$, $b$ and $c$ with lands $a$ and $b$ being of the same diameter and land $c$ being of larger diameter than lands $a$ and $b$. Housing 24 has a controlled feed port 28 connected to feed passage 18, a pressure delivery port 30, an exhaust port 32, a governor pressure delivery port 34 connected to governor pressure delivery passage 22 and a chamber 36. A flow control orifice 38 and a passage 40 in the valve element 26 connect valve element 26 between lands $a$ and $b$ to the chamber 36, a pressure delivery passage 42 connects the delivery port 30 to the transmission controls and fluid elements such as the main line regulator valve 10 and/or shift valves and the like, and an exhaust passage 44 connects exhaust port 32 to the sump.

The ambient atmospheric pressure compensated vacuum modulator generally designated at 46 is reflective of the torque load on the engine, not shown, as a function of intake manifold vacuum, corrects for changes in ambient atmospheric pressure and provides a controlling net effective output force correlated to these parameters to act in a leftward direction, as viewed in FIGURE 1, on the valve element 26 in opposition to the hydraulic forces acting on valve element 26 such as will be subsequently explained in detail.

Modulator 46, as best shown in FIGURE 2, comprises a main cylindrical casing or housing 48 and a cup-shaped cover or cap 50 secured to the housing 48. The housing 48 narrows at its left-hand end to provide a neck 52 for receiving internally a connector sleeve 54 and externally a connector flange 56. Sleeve 54 is brazed to neck 52 and is closely fitted, as shown in FIGURE 1, in a bore in housing 24 and circumjacent the stem 58 extending rightwardly from and integral with valve element 26. Flange 56 is also brazed to neck 52 and, as shown in FIGURE 1, a clamp 60 secured by bolt 62 to valve housing 24 engages one side of the flange 56 and holds this flange against a seal ring 64 positioned between the opposite side of the flange and a sealing surface of the valve housing 24. The sleeve 54 has radially inwardly extending tangs 65 engageable with land $c$ of valve element 26 to limit movement of the valve element to the right during valve operation as will be subsequently explained. Modulator 46 is thus fixed against movement relative to the housing 24 and the seal ring 64 prevents leakage between the sleeve 54 and housing 24.

A rolling type flexible diaphragm 66 having a deep convolution and a constant effective area throughout its length of travel extends transversely of housing 48 and cap 50. Diaphragm 66 whose periphery is held between a flange on the housing and cap at their juncture divides the modulator 46 into an atmospheric pressure chamber 68 and a vacuum chamber 70. A pipe 72 brazed to cap 50 connects, via suitable passage means, vacuum chamber 70 to the engine intake manifold, not shown, which provides an engine vacuum source reflective of engine torque.

A cup 74 and a diaphragm protector plate 76 are located on opposite sides of the diaphragm 66. A movable support plate 78 abuts protector plate 76 and the support plate 78, protector plate 76, diaphragm 66 and cup 74 are secured together by a rivet 80 and thus move together in either axial direction as a unit.

A sealed and evacuated bellows generally designated at 82 disposed in atmospheric pressure chamber 68 comprises a series of metallic wafers 84, each being soldered at its inner and outer periphery to an adjacent wafer. The bellows 82 is preferably evacuated to about 200 microns of water which is an easily obtainable value and at this pressure, temperature and therefore pressure changes of the remaining air in the bellows is negligible. The rightmost wafer, as viewed in FIGURE 2, is soldered at its outer periphery to a movable end plate 86 and the leftmost wafer is soldered at its outer periphery to a fixed end plate 88. Plates 88 and 86 have inwardly projecting projections 89 and 90 respectively projecting inwardly into the bellows 82 and are engageable with each other to limit the contraction of the bellows in response to pressure acting on the external surface area of the bellows. A nipple 91 brazed to projection 90 is brazed shut at its nipple end and is the passage through which air was extracted to provide the vacuum in the bellows 82. By employing metallic wafers, the bellows 82 has an inherent spring biasing force resisting its collapse which is utilized as will be subsequently explained in detail.

The fixed end plate 88 is held in place in the housing 48 by a plurality of circumferentially spaced legs 92 having flange portions, such as flange portions 93, integral with end plate 88, which are retained against a radially extending wall portion of the housing 48 by crimps, such as crimp 94, in the housing 48. End plate 88 fastens or anchors the left end of the bellows 82 to the housing 48 and the expansive and contractive forces of the bellows 82 are transmitted to the movable end plate 86. End plate 86 is rigidly secured to the support plate 78 by means of circumferentially spaced tangs, such as tang 95, integral with plate 86 received and retained in slots in several of the radially extending legs, such as leg 99, integral with support plate 78 by bending over the ends of these tangs. Thus the movable end plate 86 of the bellows 82, support plate 78, protector plate 76, diaphragm 66 and cup 74 move in either axial direction conjointly and are prevented from lateral movement.

A calibrating compression spring 98 seats upon the legs of fixed end plate 88 and the legs of support plate 78. Spring 98 provides a biasing force resisting contraction of the bellows 82 in addition to the inherent spring biasing force provided by the metallic wafers 84 as will be subsequently explained in detail.

The net effective output force of the modulator 46 is transmitted to the valve element 26 by means of a force transmitting strap 102 having a pair of diametrically opposed legs such as leg 104, the other leg not being shown, extending longitudinally or axially of the bellows 82. These legs are received in and guided by guide slots, such as slot 106 in the fixed end plate 88 shown to receive and guide leg 104, to permit free axial or longitudinal movement of the strap 102 relative to the fixed end plate 88 while preventing twisting movement relative to the axis of the bellows 82. Strap 102 is rigidly secured to the support plate 78 by means of tangs integral with the strap legs, such as tang 108 integral with the leg 104, which are received and retained in slots in diagonally opposite legs of support plate 78, such as leg 100, the other leg not being shown, by bending over the ends of these tangs. Thus the movable end plate 86 of bellows 82 and the diaphragm 66 are rigidly connected to strap 102. Strap 102 is in abutting relationship with an adjustable spacer 110 which has a closed bore receiving a reduced diameter portion 112 of stem 58 with the spacer 110 engaging at its left end the step 114. By varying the lengths of the spacer 110 the position of the strap 102 relative to valve element 26 can be varied to provide the proper relationship therebetween for a particular application.

A port 116 in housing 24 in addition to exhausting to the sump any fluid leakage past land $c$ admits ambient atmospheric pressure to the atmospheric pressure chamber 68 via passage 118 which is defined by the exterior of stem 58 and spacer 110, and the internal wall of sleeve 54.

Transmission shifts are timed so there is always a proper relationship between the engine torque, vehicle speed and the resultant clutch and/or brake motor forces in the transmission to avoid harsh clutch and/or brake action especially during shifting from one speed ratio to another. Control valve 14 of this embodiment causes the pressure in the controlled pressure delivery port 30 and thus passage 42 to accurately reflect torque demand and changes in vehicle speed and correct for changes in ambient atmospheric pressure.

The controlled pressure in delivery passage 42 is delivered to the transmission shift valves and may also be delivered to the main line regulator valve 10. This controlled pressure in the case of shift valves opposes biasing forces such as governor pressure or a spring force acting on the shift valves so that the timing of the actuation of the shift valves to deliver fluid pressure from a suitable source, such as from feed passage 18 via branch passage 19 and suitable transmission controls and fluid elements such as a selector valve, to the clutch and/or brake motors is either delayed or increased to permit greater or lesser acceleration respectively in the different speed ratios. In the case where this controlled pressure opposes biasing forces acting on the main line regulator valve, the main line pressure is caused to be varied in accordance with speed and load to control clutch and/or brake engagement.

The control valve 14 regulates the pressure in port 30 and thus passage 42 in a conventional manner and this operation can be described more easily by assuming that the governor pressure acting on the unbalance of land $c$ to urge the valve element 26 to the right is constant and also that the net effective output or biasing force provided by the modulator 46 is a constant biasing force acting on the valve element 26 to urge the valve element 26 to the left. Assuming further, that the leftward biasing force provided by the modulator 46 is sufficient to overcome the rightward bias of the governor pressure acting on land c to cause the valve element 26 to open port 28 connected to feed passage 18, pressure fluid will then be allowed to pass between lands a and b to port 30 and thence to passage 42. The pressure fluid also passes between lands a and b and at a controlled rate through the control orifice 38 and is delivered via passage 40 to the chamber 36 where the net effect is to urge the valve element 26 to the right until exhaust port 32 is uncovered by land c, reducing the pressure. With a constant net effective leftward biasing force acting on the valve element 26, the valve element 26 will continuously reciprocate in the foregoing manner to control the opening of the controlled feed port 28 and supply a regulated control pressure to the port 30 and thus the passage 42, the amount of the pressure being determined by the bias effect.

The maximum and minimum regulated control pressure will be predetermined for a particular engine-transmission vehicle combination and may be anything reasonably desired. For demonstration purposes it will be assumed that the net effective biasing force of the governor pressure of governor 12 and modulator 46, when the governor pressure is a minimum such as with the engine idling and the vehicle at rest and the output force of the modulator 46 is a minimum, is sufficient to permit valve element 26 to move to the right to permit land a to close port 28 and land b to open exhaust port 32 so that the control pressure in port 30 and thus passage 42 is zero with rightward movement of valve element 26 being limited by the tangs 65 on sleeve 54. At the other extreme it will be assumed that the net effective biasing force provided by the governor pressure of governor 12 and the modulator 46 when the governor pressure is a maximum, such as with the vehicle at a predetermined speed and the output force of the modulator 46 is a maximum, is sufficient to permit land a to open port 28 sufficiently to offset the regulation of valve element 26 and cause the regulated control pressure in port 30 and thus passage 42 to be the same as that in feed passage 18. In between these maximum and minimum extremes of the regulated control pressure, the valve element 26 will regulate in the desecribed conventional manner.

The net effective output force of the modulator 46 is reflective of the torque load on the engine as a function of intake manifold vacuum and corrects for changes in intake manifold vacuum resulting from changes in ambient atmospheric pressure. As it is well known to those skilled in the art, with the engine idling the vacuum developed in the intake manifold is a highly negative pressure and therefore for purposes of this explanation will be referred to as a high manifold pressure. At high engine speeds and small throttle openings the manifold vacuum is also highly negative. On the other hand, with a full load on the engine, the vacuum in the intake manifold approaches ambient atmospheric pressure therefore becoming less negative and will be called a low manifold presure. With the foregoing in mind, the net effective output force of the modulator 46 which always remains a force acting in the leftward direction, as viewed in FIGURES 1 and 2, is determined by that force transmitted to the force transmitting strap 102. Ambient atmospheric pressure which will be assumed at this point to remain constant existing in the environment in which the vehicle is operated enters the atmospheric pressure chamber 68 via port 116 and passage 118, acts to compress the sealed and evacuated bellows 82 and provides the primary and major biasing force, and the sole leftward force acting on the strap 102. The net effective pressure acting to compress the bellows 82 is equivalent to substantially absolute ambient atmospheric pressure since the pressure in the bellows is close to zero pressure. The inherent spring biasing force of the metallic wafers of the bellows 82 and the biasing force of calibrating spring 98 resist the compression of the bellows 82 and thus these spring biasing forces decrease or subtract from the leftward biasing force resulting from ambient atmospheric pressure acting on the external surface area of the bellows 82. Ambient atmospheric pressure in chamber 68 also acts on the left-hand side of diaphragm 66 and with high manifold pressure acting on the opposite or right-hand side of diaphragm 66, such as occurs when the engine is idling, the net result of these pressures acting on the diaphragm is to transmit a rightward biasing force to strap 102 which is a maximum at this constant ambient atmospheric pressure. This rightward biasing force provided by the diaphragm 66, like the rightwardly acting spring biasing forces of calibrating spring 98 and bellows 82, reduces or subtracts from the leftward biasing force resulting from the ambient atmospheric pressure acting on the external surface area of the bellows 82. The net result of all these biasing forces transmitted to the strap 102 is a leftward biasing force or a net effective output force at this constant ambient atmospheric pressure which is reflective of engine torque load as a function of intake manifold vacuum and which is a minimum when intake manifold pressure is high, such as when the engine is idling. Furthermore, the net effective output force is related to a fixed reference, that fixed reference being the substantially zero pressure reference provided by the sealed and evacuated bellows 82.

On the other hand, and with the ambient atmospheric pressure still remaining constant at this point, when low manifold pressure acts on the right-hand side of diaphragm 66, such as occurs with a full torque load on the engine, the net result of the pressures acting on the diaphragm 66 is a decreased rightwardly acting force which is a minimum at this constant ambient atmospheric pressure. Since intake manifold vacuum is the only parameter which has changed under such circumstances, the net effective output force of the modulator 46 as transmitted by the strap 102 is a maximum and thus occurs when intake manifold pressure is low, such as where there is a full torque load on the engine.

In between these high and low extremes of intake manifold pressure and correspondingly minimum and maximum net effective output forces of the modulator 46, the net effective output force increases with decreasing intake manifold pressure and decreases with increasing intake manifold pressure while the ambient atmospheric pressure remains constant.

The operation of the bellows 82 is twofold in that firstly, it provides when acted upon by ambient atmospheric pressure the sole leftward biasing force to oppose the fluid pressure forces acting rightwardly on the valve element 26 and it is this leftward force which is opposed by the effect of the parameter of intake manifold pressure to provide a leftward net effective output force which reflects engine torque load as explained previously. Secondly, the arrangement of the bellows 82 provides a compensation as reflected by changes in the net effective output force of the modulator 46 for changes in ambient atmospheric pressure.

Considering now the compensation for changes in ambient atmospheric pressure, when such pressure decreases such as with respect to the previously constant ambient atmospheric pressure, this reduced ambient atmospheric pressure acting on the external area of the bellows 82 results in expansion of the bellows. The ambient atmospheric pressure may decrease as the result of an increase in the altitude at which the vehicle is operated or as a result of climatic changes at a given altitude but suffice it to say that the ambient atmospheric pressure does decrease. As the bellows 82 expands, the preponderant leftwardly acting output force of the bellows 82 resulting from initial compression of the bellows 82 as a result of the aforementioned constant ambient atmospheric pressure is reduced or subtracted from by this change because of the smaller differential pressure acting on the bellows 82. This results in reduction in the leftwardly acting net effective output force of the modulator 46 which causes the valve element 26 to regulate at a lower pressure. Conversely, upon an increase in ambient atmospheric pressure relative to the aforementioned constant ambient atmospheric pressure there occurs a larger differential pressure acting on the bellows 82 which results in an increased leftwardly acting output force from the bellows 82 acting on the strap 102. This increases the net effective output force of the modulator 46 and causes the valve element 26 to regulate at a higher pressure. Compression of the bellows 82 is limited by engagement of the projections 89 and 90 to prevent harm to the bellow structure, and limits the range of the net effective output force of the modulator.

In correlating the effect of the modulator 46 to the engine, it should be kept in mind that as a general rule the volumetric efficiency of the internal compression engine decreases with a decrease in ambient atmospheric pressure from a given ambient atmospheric pressure and consequently the engine torque available at any given engine speed. Therefore, if a shift that was intended to occur at a certain engine torque takes place at this reduced torque, it will be appreciated that the optimum shift point is not achieved and a rough shift results. Conversely, the volumetric efficiency increases with an increase in ambient atmospheric pressure from a given ambient atmospheric pressure and consequently, the engine torque available at any given engine speed and thus again it will be appreciated that the optimum shift point may no longer be achieved and a rough shift results. Hence, for smooth transitions from one speed ratio to another, it is desired that the regulated control pressure which is utilized to oppose biasing forces acting on either the main line regulator valve and/or the shift valves be sufficient and in this embodiment of large enough magnitude to deliver a delayed upshift when the torque demand is great to permit greater acceleration and conversely of small enough magnitude to effect an earlier upshift when the torque demand is less and correspondingly less acceleration is needed.

With this vacuum modulator and using a constant reference pressure as provided by the vacuum in the sealed bellows 82, the changes in the torque capacity of the engine are detected by the modulator 46 and its influence on the valve element 26 is altered so that the shift will occur at the optimum speed and torque.

Because the changes in engine torque reflected by intake manifold pressure are generally not at the same rate as the changes in ambient atmospheric pressure, the bellows 82 and diaphragm 66 provide a combined output force which is a compromise of the two. Since the sole leftward acting force of the vacuum modulator 46 to oppose fluid pressures acting rightwardly on valve element 26 is that biasing force provided by the effect of the ambient atmospheric pressure acting on the bellows 82 and which is the preponderant or primary and major biasing force, this leftwardly acting and dominating force is directly responsive to changes in ambient atmospheric pressure and closely controls the valve element to correct for changes in ambient atmospheric pressure. While a calibrating spring 98 has been shown which is utilized to resist the compression of the bellows 82, this spring is intended as an additional means of calibration of the modulator to a particular application since the bellows 82 has an inherent spring biasing force itself. By providing bellows 82 with a predetermined spring biasing force, in itself sufficient to calibrate the modulator to a particular application, the use of a calibrating spring would not be necessary.

Since the spring biasing forces provided by the calibrating spring 98 and the bellows 82 are not related to ambient atmospheric changes, any increase or decrease in their sum total either adds to or subtracts from the net effective output force of the vacuum modulator a force which is constant regardless of atmospheric pressure changes. Changes in these spring forces results in what is termed as parallel calibration when the net effective output force of the modulator 46 is plotted against absolute ambient atmospheric pressure for these different spring biasing forces and at the different intake manifold pressures.

On the other hand, with the bellows 82 being acted upon by the variable parameter ambient atmospheric pressure and since the contraction or compression of the bellows 82 provides the primary and major force, changes in its effective surface area is evidenced by corresponding changes in slope of this net effective output force-absolute ambient atmospheric pressure relationship. Since this slope is representative of the rate of change of the net effective output force relative to changes in ambient atmospheric pressure, the responsiveness of the modulator 46 to small changes in ambient pressure is made closely controllable so that shift points within two to three miles per hour, for instance, can be obtained.

Further calibration of the modulator 46 is obtainable by varying the effective area of the diaphragm 66. This is possible, for instance, by changing the dimensions of cup 74 and protector plate 76 and also by changing the dimensions of cap 50 wherein the effective area of the diaphragm 66 can be either increased or decreased. Preferably, the diaphragm 66 is of the type having a deep convolution as aforementioned and, furthermore, of the rolling type which provides a constant effective area throughout its length of travel so that there will not occur variations in this effective area during its range of operation which would tend to adversely affect the operation of the modulator. As aforementioned, since the changes in the engine torque as reflected by intake manifold vacuum are not at the same rate as the changes in ambient atmospheric pressure, by changing the ratio of the effective area of the diaphragm 66 to the effective area of the bellows 82, a satisfactory compromise can be made for the difference in the rates of pressure changes in the atmospheric pressure chamber 68 and vacuum chamber 70 where this difference limits the effectiveness of the modulator for a particular transmission-engine vehicle combination. This ratio can be 1.0:1 where in a particular transmission-engine vehicle combination these rates of change closely approach each other or become equivalent.

Without such a compensation for engine torque changes resulting from changes in ambient atmospheric pressure, shifts would tend to occur at the same point despite changes in available engine torque and would become rougher than when made at the peak torque speeds of the engine. In other words, the governor pressure and their relationship to a shift valve is intended, assuming full torque conditions, to produce shifts at certain vehicle speeds and corresponding torque. With the employment of the modulator 46 if the vehicle has gone to a higher altitude or climatic conditions at a particular altitude have changed so as to reduce available engine torque, manifold pressure will decrease slightly and accordingly the regulated control pressure. As a consequence, the particular shift will occur sooner at this reduced regulated control pressure producing a smooth transition. Conversely, a particular shift may be made to occur later with an increased regulated control pressure to produce a smooth transition when the available engine torque has increased as a result of a lower altitude or climatic conditions at a particularly altitude having changed so as to increase available engine torque.

What is claimed:

1. In a transmission control system for an engine driven vehicle transmission the combination of (a) means providing a regulated fluid pressure source, (b) pressure control means connected to said regulated fluid pressure source and adapted to supply a variable control pressure, (c) and modulator means controlling said pressure control means including first motor means having a constant reference pressure and responsive to the differences in pressure between ambient atmospheric pressure and said constant reference pressure to provide a large variable force to control said pressure control means, and second motor means connected to an engine vacuum source reflective of engine torque and responsive to the differences in pressure between ambient atmospheric pressure and engine vacuum to provide a small variable force to control said pressure control means to provide a control pressure reflective of engine torque as a function of engine vacuum and correct for changes in engine vacuum resulting from changes in ambient atmospheric pressure.

2. In a transmission control system for an engine driven vehicle transmission the combination of (a) means providing a regulated fluid pressure source, (b) pressure control means connected to said regulated fluid pressure source and adapted to supply a variable control pressure, (c) and modulator means controlling said pressure control means including first motor means having a constant reference pressure and responsive to the differences in pressure between ambient atmospheric pressure and said constant reference pressure to provide a variable output force acting in one direction to control said pressure control means, and second motor means connected to an engine vacuum source reflective of engine torque and responsive to the differences in pressure between ambient atmospheric pressure and engine vacuum to provide a small variable output force to decrease said output force of said first motor means to provide a control pressure reflective of engine torque as a function of engine vacuum and correct for changes in engine vacuum resulting from changes in ambient atmospheric pressure.

3. In a transmission control system for an engine driven vehicle transmission the combination of (a) means providing a regulated fluid pressure source, (b) pressure control means connected to said regulated fluid source and adapted to supply a variable control pressure, (c) and modulator means controlling said pressure control means including first means acted upon by substantially ambient absolute atmospheric pressure providing a large output biasing force variable with changes in ambient atmospheric pressure to control said pressure control means, and second means connected to an engine vacuum source and acted upon by engine vacuum and ambient atmospheric pressure providing a small output biasing force variable with changes in engine vacuum and ambient atmospheric pressure to control said pressure control means whereby said variable biasing forces combined provide a net effective variable biasing force to control said pressure control means to vary the control pressure in accordance with changes in torque demand as a function of engine vacuum and correct for changes in engine vacuum resulting from changes in ambient atmospheric pressure.

4. In a transmission control system for an engine driven vehicle transmission the combination of (a) means providing a regulated fluid pressure source, (b) pressure control means connected to said regulated fluid pressure source and adapted to supply a variable control pressure, (c) and modulator means controlling said pressure control means including first means acted upon by substantially absolute ambient atmospheric pressure providing a large output biasing force variable with changes in ambient atmospheric pressure acting in one direction on said pressure control means and second means connected to an engine vacuum source acted upon by engine vacuum and ambient atmospheric pressure providing a small output biasing force variable with changes in engine vacuum and ambient atmospheric pressure acting in the opposite direction to decrease said large output biasing force whereby said biasing forces combined provide a net effective variable biasing force to act on said pressure control means to vary the control pressure in accordance with changes in torque demand as a function of engine vacuum and correct for changes in engine vacuum resulting from changes in ambient atmospheric pressure.

5. In a transmission control system for an engine driven vehicle transmission the combination of (a) means providing a regulated fluid pressure source, (b) pressure control means connected to said fluid pressure source and adapted to supply a variable control pressure, (c) and modulator means controlling said pressure control means including first motor means having a constant reference pressure and responsive to the differences in pressure between ambient atmospheric pressure and said constant reference pressure to provide a large biasing force acting in one direction on said pressure control means and second motor means connected to a source of engine vacuum and responsive to the differences in pressure between ambient atmospheric pressure and engine vacuum to provide a small biasing force acting in the opposite direction whereby the net effective biasing force of said first and second motor means is provided mainly by said first motor means and acts in said one direction on said pressure control means to provide a control pressure which varies in accordance with the changes in engine torque as reflected by engine vacuum and corrects for changes in engine vacuum resulting from changes in ambient atmospheric pressure.

6. In a transmission control system for an engine driven vehicle transmission the combination of (a) means providing a regulated fluid pressure source, (b) pressure control means controlling said regulated fluid pressure source including a valve element movable in one direction to supply an increasing control pressure and in the opposite direction to supply a decreasing control pressure and having pressure responsive means responsive to the fluid pressure being supplied by said valve element to bias said valve element in said opposite direction, (c) and modulator means including first motor means having a constant reference pressure and responsive to the differences in pressure between ambient atmospheric pressure and said constant reference pressure to provide a large variable output biasing force acting in said one direction on said valve element which decreases with decreasing ambient atmospheric pressure and second motor means connected to a source of engine vacuum and responsive to the differences in pressure between ambient atmospheric pressure and engine vacuum to provide a small variable output force acting in said opposite direction which increases with increasing engine vacuum whereby said biasing forces of said first and second motor means combined provide a net effective variable biasing force in opposition to the fluid pressure bias on said valve element to vary the control pressure supplied within a controlled predetermined range of values and provide decreasing control pressure with decreasing ambient atmospheric pressure and increasing engine vacuum.

7. In a transmission control system for an engine driven vehicle transmission the combination of

13

(a) means providing a regulated fluid pressure source,
(b) pressure control means connected to said regulated fluid pressure source including a valve element movable in one direction to supply an increasing control pressure and in the opposite direction to supply a decreasing control pressure and having pressure responsive means responsive to the fluid pressure being supplied by said valve element to bias said valve element at a controlled rate in said opposite direction,
(c) and modulator means controlling said pressure control means including first means acted upon by substantially absolute ambient atmospheric pressure providing a large variable output biasing force acting in said one direction on said valve element which decreases with decreasing ambient atmospheric pressure and second means connected to a source of engine vacuum acted upon by engine vacuum and ambient atmospheric pressure providing a small variable output biasing force acting in said opposite direction which increases with increasing engine vacuum whereby said biasing forces of said first and second means combined provide a net effective variable biasing force in opposition to the fluid pressure bias on said valve element to vary the control pressure supplied within a controlled predetermined range of values and provide decreasing control pressure with decreasing ambient atmospheric pressure and increasing engine vacuum.

8. In a transmission control system for an engine driven vehicle transmission the combination of
(a) means providing a regulated fluid pressure source,
(b) pressure control means connected to said regulated fluid pressure source and adapted to supply a variable control pressure,
(c) modulator means controlling said pressure control means to vary the control pressure including first and second motor means,
(d) said first motor means including a sealed and evacuated bellows exposed to ambient atmospheric pressure and responsive to the differences in pressure between ambient atmospheric pressure and the sealed vacuum to provide one variable output biasing force acting in one direction on said pressure control means to vary the control pressure,
(e) and said second motor means connected to a source of engine vacuum including a diaphragm exposed on one side to engine vacuum and on the opposite side to ambient atmospheric pressure and responsive to the differences in pressure between ambient atmospheric pressure and engine vacuum to provide another variable output biasing force smaller than said one variable output biasing force acting in the opposite direction to vary the control pressure whereby the combined biasing forces of said first and second motor means provide a net effective variable biasing force acting in said one direction on said pressure control means to vary the control pressure in accordance with changes in torque demand as a function of engine vacuum and correct for changes in engine vacuum resulting from changes in ambient atmospheric pressure.

9. In a transmission control system for an engine driven vehicle transmission the combination of
(a) means providing a regulated fluid pressure source,
(b) pressure control means connected to said regulated fluid pressure source including a valve element movable in one direction to provide an increasing control pressure and in the opposite direction to provide a decreasing control pressure and having pressure responsive means responsive to the pressure fluid being supplied by said valve element to bias said valve elements at a controlled rate in said opposite direction,

14

(c) modulator means controlling said pressure control means to vary the control pressure including first and second motor means,
(d) said first motor means including a sealed and evacuated bellows exposed to ambient atmospheric pressure responsive to the differences in pressure between ambient atmospheric pressure and the sealed vacuum to provide a variable output biasing force acing in said one direction on said valve element to vary the control pressure,
(e) and said second motor means being connected to a source of engine vacuum and including a diaphragm exposed on one side of engine vacuum and on the opposite side to ambient atmospheric pressure responsive to the differences in these pressures to provide a variable output biasing force smaller than said output biasing force of said first motor means acting in said opposite direction to vary the control pressure whereby the combined biasing forces of said first and second motor means provide a net effective variable biasing force acting in said one direction to vary the control pressure in accordance with changes in engine torque as a function of engine vacuum and correct for changes in engine vacuum resulting from changes in ambient atmospheric pressure.

10. The invention defined in claim 9 and said bellows being a metallic structure having an inherent spring biasing force to decrease the net effective variable output force by a predetermined amount and said diaphragm being a rolling type diaphragm having a constant effective area throughout its length of travel.

11. In a transmission control system for an engine driven vehicle transmission the combination of
(a) means providing a regulated fluid pressure source,
(b) means providing a variable governer pressure reflective of vehicle speed,
(c) pressure control means connected to said regulated fluid pressure source and adapted to supply a variable control pressure and having a valve element movable in one direction to provide an increasing control pressure,
(d) said pressure control means having first pressure responsive means responsive to the fluid pressure being controlled to urge said valve element in the opposite direction to decrease the control pressure and second pressure responsive means responsive to the governor pressure to further urge said valve element in said opposite direction with a biasing force which increases with vehicle speed,
(e) and ambient atmospheric pressure compensated vacuum modulator means controlling said pressure control means including first motor means having a constant reference pressure responsive to the pressure differential between ambient atmospheric pressure and the constant reference pressure to provide a large variable output force to act in said one direction on said valve element and second motor means connected to a source of engine vacuum responsive to the pressure differential between engine vacuum and ambient atmospheric pressure to provide a small variable output force to act in said opposite direction on said valve element whereby said output forces of said first and second motor means combined and said governor pressure bias said pressure control means to provide a control pressure reflective of vehicle speed and engine torque as a function of engine vacuum which is corrected for changes in ambient atmospheric pressure.

12. In an ambient atmospheric pressure compensated vacuum modulator the combination of
(a) first motor means responsive to ambient atmospheric pressure to provide a biasing force acting in one direction which varies with changes in ambient atmospheric pressure, (b) and second motor means connected to a variable vacuum source responsive to the differences in pressure between ambient atmospheric pressure and vacuum from said variable vacuum source to provide a smaller variable biasing force acting in the opposite direction whereby the combined biasing forces of said first and second motor means provide a net effective variable biasing force acting in one direction reflective of changes in the vacuum from said variable vacuum source and ambient atmospheric pressure.

13. In an ambient atmospheric pressure compensated vacuum modulator the combination of (a) first motor means having constant reference pressure means containing a constant reference pressure responsive to ambient atmospheric pressure to provide a large biasing force acting in one direction reflective of ambient atmospheric pressure relative to the constant reference pressure which decreases with decreasing ambient atmospheric pressure, (b) and second motor means connected to a variable vacuum source responsive to changes in ambient atmospheric pressure and vacuum from said variable vacuum source providing a small biasing force acting in the opposite direction which increases with increasing vacuum whereby the combined biasing forces provided by said first and second motor means provides a net effective biasing force acting in said one direction which increases with increasing vacuum and decreasing ambient atmospheric pressure.

14. In an ambient atmospheric pressure compensated vacuum modulator the combination of (a) support means and force transmitting means reciprocally mounted on said support means, (b) first motor means operatively connected to said force transmitting means acted upon by substantially absolute ambient atmospheric pressure providing a large output biasing force acting in one direction on said force transmitting means which varies with changes in ambient atmospheric pressure, (c) and second motor means connected to a variable vacuum source and operatively connected to said force transmitting means acted upon by vacuum and ambient atmospheric pressure providing a small output force acting in the opposite direction on said force transmitting means which varies with changes in ambient atmospheric pressure and vacuum whereby said output biasing forces combined provide a net effective output biasing force acting in said one direction.

15. In an ambient atmospheric pressure compensated vacuum modulator the combination of (a) support means and force transmitting means reciprocally mounted on said support means, (b) first motor means operatively connected to said force transmitting means having a sealed bellows containing a constant reference pressure exposed to ambient atmospheric pressure responsive to the differences in pressure between ambient atmospheric pressure and said constant reference pressure to provide a large output biasing force acting in one direction on said force transmitting means which varies with changes in ambient atmospheric pressure, (c) and second motor means connected to a source of variable vacuum and operatively connected to said force transmitting means responsive to the differences in pressure between ambient atmospheric pressure and vacuum to provide a small output biasing force to decrease said large output biasing force provided by said first motor means to provide a net effective variable biasing force which varies with changes in ambient atmospheric pressure and vacuum.

16. In an ambient atmospheric pressure compensated vacuum modulator the combination of (a) support means and force transmitting means reciprocally mounted on said support means, (b) first motor means including a sealed and evacuated bellows exposed to ambient atmospheric pressure responsive to the differences in pressure between ambient atmospheric pressure and the sealed vacuum to provide one variable output biasing force acting in one direction on said force transmitting means which decreases with decreasing ambient atmospheric pressure, (c) and second motor means connected to a source of engine vacuum including a diaphragm exposed on one side to engine vacuum and on the opposite side to ambient atmospheric pressure responsive to the differences in these pressures to provide another variable output biasing force smaller than said one output biasing force acting in the opposite direction on said force transmitting means which increases with increasing engine vacuum whereby the combined biasing forces provide a net effective variable biasing force to act in said one direction on said force transmitting means which is reflective of changes in engine vacuum in relation to said fixed reference pressure and is corrected for changes in engine vacuum resulting from changes in ambient atmospheric pressure.

17. In an ambient atmospheric pressure compensated vacuum modulator for a transmission control system for an engine driven vehicle transmission the combination of (a) support means and force transmitting means reciprocally mounted on said support means, (b) first motor means mounted on said support means and operatively connected to said force transmitting means having a constant reference pressure and responsive to the differences in pressure between ambient atmospheric pressure and said constant reference pressure to provide a large biasing force acting in one direction on said force transmitting means, (c) and second motor means mounted on said support means and operatively connected to said force transmitting means and connected to a source of engine vacuum responsive to the differences in pressure between ambient atmospheric pressure and engine vacuum to provide a small biasing force acting in the opposite direction on the said force transmitting means whereby the net effective biasing force of said first and second motor means is provided mainly by said first motor means and acts in said one direction on said force transmitting means to provide a controlled net effective biasing force variable in accordance with changes in engine torque as a function of engine vacuum and corrected for changes in engine vacuum resulting from changes in ambient atmospheric pressure.

18. In an ambient atmospheric pressure compensated vacuum modulator the combination of (a) support means and force transmitting means reciprocally mounted on said support means, (b) first motor means comprising a sealed and evacuated bellows fixed to said support means and operatively connected to said force transmitting means and exposed to ambient atmospheric pressure, (c) second motor means comprising first and second chambers and a diaphragm separating said chambers operatively connected to said force transmitting means, (d) said first chamber connected to a variable vacuum source and said second chamber exposed to ambient atmospheric pressure, (e) said first motor means providing one variable biasing force to act on said force transmitting means in one direction which increases with increasing ambient atmospheric pressure and decreases with decreasing ambient atmospheric pressure, (f) and said second motor means providing another biasing force smaller than said one biasing force to act on said force transmitting means in the opposite direction which increases with increasing vacuum and decreases with decreasing vacuum.

19. The invention defined in claim 18 and said bellows being a metallic structure having a predetermined spring biasing force to decrease said one variable biasing force, said diaphragm being a rolling type diaphragm having a constant effective area and a calibrating spring arranged to decrease said one variable biasing force by a predetermined amount.

20. In an ambient atmospheric pressure compensated vacuum modulator for a transmission control system for an engine driven vehicle the combination of
(a) a housing and a force transmitting means reciprocally mounted in said housing,
(b) a diaphragm mounted in said housing separating said housing into first and second chambers,
(c) a sealed and evacuated bellows mounted in said first chamber and fixed at one end to said housing and at the opposite end operatively connected to said force transmitting means,
(d) said diaphragm being operatively connected to said force transmitting means, said first chamber being exposed to ambient atmospheric pressure and said second chamber being connected to a source of engine vacuum,
(e) said bellows being responsive to the differences in pressure between ambient atmospheric pressure and the sealed vacuum to provide one output biasing force acting in one direction on said force transmitting means,
(f) and said diaphragm being responsive to the difference in pressure between ambient atmospheric pressure and engine vacuum to provide another output biasing force smaller than said one output biasing force acting in the opposite direction on said force transmitting means whereby the combined biasing forces provide a net effective biasing force acting in said one direction on said force transmitting means which is reflective of engine torque as a function of engine vacuum and corrected for changes in engine vacuum resulting from changes in ambient atmospheric pressure.

References Cited by the Examiner
UNITED STATES PATENTS

| | | | |
|---|---|---|---|
| 3,020,776 | 2/1962 | May et al. | 74—472.1 |
| 3,073,183 | 1/1963 | Kelley | 74—732 |
| 3,077,122 | 2/1963 | Olsen | 74—472 |
| 3,106,104 | 9/1963 | Harry | 74—472.1 |

DAVID J. WILLIAMOWSKY, *Primary Examiner.*

J. R. BENEFIEL, *Assistant Examiner.*